United States Patent
Sharma et al.

(10) Patent No.: US 11,330,606 B2
(45) Date of Patent: May 10, 2022

(54) BASE STATION AND USER EQUIPMENT FOR TIME DIVISION DUPLEXING CONFIGURATION DECONFLICTION

(71) Applicants: Sony Corporation, Tokyo (JP); Sony Mobile Communications Inc., Tokyo (JP)

(72) Inventors: Vivek Sharma, Basingstoke (GB); Yuxin Wei, Basingstoke (GB); Anders Berggren, Lund (SE); Hideji Wakabayashi, Basingstoke (GB); Shinichiro Tsuda, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 63 days.

(21) Appl. No.: 16/642,023

(22) PCT Filed: Sep. 27, 2018

(86) PCT No.: PCT/EP2018/076264
§ 371 (c)(1),
(2) Date: Feb. 26, 2020

(87) PCT Pub. No.: WO2019/063694
PCT Pub. Date: Apr. 4, 2019

(65) Prior Publication Data
US 2020/0221470 A1    Jul. 9, 2020

(30) Foreign Application Priority Data
Sep. 28, 2017 (EP) ..................... 17193856

(51) Int. Cl.
*H04W 56/00* (2009.01)
*H04W 72/12* (2009.01)
(Continued)

(52) U.S. Cl.
CPC ............... *H04W 72/12* (2013.01); *H04L 5/14* (2013.01); *H04W 76/10* (2018.02); *H04W 92/10* (2013.01)

(58) Field of Classification Search
None
See application file for complete search history.

(56) References Cited

U.S. PATENT DOCUMENTS

2013/0148638 A1   6/2013   Xing et al.
2013/0272173 A1*  10/2013  Niu ...................... H04L 5/0037
                                                    370/280
(Continued)

OTHER PUBLICATIONS

International Search Report and Written Opinion dated Feb. 11, 2019 for PCT/EP2018/076264 filed on Sep. 27, 2018, 20 pages.
(Continued)

*Primary Examiner* — Sithu Ko
(74) *Attorney, Agent, or Firm* — Xsensus LLP

(57) ABSTRACT

The present disclosure provides a new radio base station for a mobile telecommunications system. The new radio base station has a circuitry configured to communicate with at least one user equipment and at least one LTE base station and to establish a new radio cell. The circuitry is further configured to transmit a time division duplexing configuration of the new radio cell to the LTE base station for identifying, based on the received time division duplexing configuration, a coexistence and intermodulation influence on an LTE receiver of the at least one user equipment.

19 Claims, 5 Drawing Sheets

(51) Int. Cl.
*H04W 76/10* (2018.01)
*H04L 5/14* (2006.01)
*H04W 92/10* (2009.01)

(56) References Cited

U.S. PATENT DOCUMENTS

| | | | | |
|---|---|---|---|---|
| 2013/0324113 | A1* | 12/2013 | Jechoux | H04W 74/004 |
| | | | | 455/426.1 |
| 2015/0055524 | A1* | 2/2015 | Sirotkin | H04B 7/0626 |
| | | | | 370/280 |
| 2015/0327280 | A1* | 11/2015 | Zhang | H04W 76/20 |
| | | | | 370/280 |
| 2016/0095039 | A1* | 3/2016 | Valliappan | H04W 72/1215 |
| | | | | 370/332 |
| 2017/0064658 | A1* | 3/2017 | Yun | H04L 5/1438 |
| 2017/0295589 | A1* | 10/2017 | Sundararajan | H04W 74/002 |
| 2018/0007583 | A1* | 1/2018 | Hong | H04W 72/0446 |
| 2018/0220434 | A1* | 8/2018 | Takeda | H04W 72/02 |
| 2018/0279303 | A1* | 9/2018 | Sun | H04W 72/1278 |
| 2018/0316472 | A1* | 11/2018 | John Wilson | H04W 76/15 |
| 2020/0119889 | A1* | 4/2020 | Jiang | H04L 5/0048 |
| 2020/0145934 | A1* | 5/2020 | Wang | H04L 5/0094 |

OTHER PUBLICATIONS

3GPP, "5G; NG-RAN; Xn Application Protocol (XnAP)", ETSI 3rd Generation Partnership Project, Technical Specification 38.423 version 15.0.0, Release 15, Jul. 2018, pp. 1-188.

3GPP, "LTE;Evolved Universal Terrestrial Radio Access (E-UTRA) and Evolved Universal Terrestrial Radio Access Network (E-UTRAN)", Overall description, Stage 2, ETSI 3rd Generation Partnership Project, Technical Specification 36.300 version 14.3.0,Release 14, Jul. 2017, pp. 1-346.

3GPP, "LTE;Evolved Universal Terrestrial Radio Access (E-UTRA); Radio Resource Control (RRC); Protocol specification", ETSI 3rd Generation Partnership Project, Technical Specification 36.331 version 14.3.0, Release 14, Oct. 2017, pp. 1-751.

3GPP, "LTE;Evolved Universal Terrestrial Radio Access Network (E-UTRAN); X2 Application Protocol (X2AP)", ETSI 3rd Generation Partnership Project, Technical Specification 36.423 version 14.3.0, Release 14, Aug. 2017, pp. 1-242.

3GPP, "Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT)," Overall description; Stage 2, ETSI 3rd Generation Partnership Project, Technical Specification 37.320 version 14.0.0, Apr. 2017, Release 14, pp. 1-27.

AT&T et al., "WF on RAN3 signaling support for LTE-NR coexistence feature", 3GPP TSG RAN WG1 Meeting No. 90, R1-1714752, Prague, Czech Republic, Aug. 21-25, 2017, 5 pages.

AT&T et al., "WF on RAN3 signaling support for LTE-NR coexistence feature", 3GPP TSG RAN WG1 Meeting No. 90, R1-1714892, Prague, Czech Republic, Aug. 21-25, 2017, 5 pages.

Huawei and Hisilicon, "Contents of messages for Xn and X2 interface to support LTE-NR coexistence", 3GPP TSG RAN WG1 Meeting No. 90, R1-1713737, Prague, Czech Republic, Aug. 21-25, 2017, 4 pages.

LG Electronics, "Discussion on the Xn and enhanced X2 interface messages in NR-LTE coexistence", 3GPP TSG RAN WG1 Meeting No. 90, R1-1713218, Prague, Czech Republic, Aug. 21-25, 2017, 4 pages.

RAN1, "LS on RAN3 signaling support for LTE-NR coexistence feature", 3GPP TSG RAN WG3 Meeting No. 97, R3-173397_R1-1715041, Berlin, Germany, Aug. 21-25, 2017, 2 pages.

Vivo, "Offline discussions and proposals on harmonic interference handling", 3GPP TSG-RAN WG1 NR_AH No. 3, R1-1716696, Nagoya, Japan, Sep. 18-21, 2017, 11 pages.

* cited by examiner ated Standard
BASE STATION AND USER EQUIPMENT FOR TIME DIVISION DUPLEXING CONFIGURATION DECONFLICTION

CROSS-REFERENCE TO RELATED APPLICATIONS

The present application is based on PCT filing PCT/EP2018/076264, filed Sep. 27, 2018, which claims priority to EP 17193856.6, filed Sep. 28, 2017, the entire contents of each are incorporated herein by reference.

TECHNICAL FIELD

The present disclosure generally pertains to base stations and user equipments for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

As discussed, in 3GPP a work Item (WI) on New Radio Access Technology (NR) has been agreed. The new Radio Access Technology (RAT) is expected to operate in a large range of frequencies, from hundreds of MHz to 100 GHz and it is expected to cover a broad range of use cases. Use cases, which are considered, are, for example:

Enhanced Mobile Broadband (eMBB)
Massive Machine Type Communications (mMTC)
Ultra Reliable & Low Latency Communications (URLLC)

At least for initial deployment, NR and LTE are expected to coexist.

Although there exist signaling techniques for LTE, it is generally desirable to improve coexisting situations between NR and LTE.

SUMMARY

According to a first aspect, the disclosure provides a new radio base station for a mobile telecommunications system including circuitry configured to communicate with at least one user equipment and at least one LTE base station and to establish a new radio cell, wherein the circuitry is further configured to transmit a time division duplexing configuration of the new radio cell to the LTE base station for identifying, based on the received time division duplexing configuration, a coexistence and intermodulation influence on an LTE receiver of the at least one user equipment.

According to a second aspect, the disclosure provides a LTE base station for a mobile telecommunications system including circuitry configured to communicate with at least one user equipment and at least one new radio base station, the new radio base station establishing a new radio cell, wherein the circuitry is further configured to receive a time division duplexing configuration of the new radio cell from the new radio base station.

According to a third aspect, the disclosure provides a user equipment for a mobile telecommunications system including circuitry configured to communicate with a new radio base station and a LTE base station, wherein the circuitry is further configured to perform simultaneous communication with the LTE base station and the new radio base station, wherein the communication with the new radio base station is based on time division duplexing and a time division duplexing configuration, wherein the time division duplexing configuration is transmitted from the new radio base station to the LTE base station.

According to a fourth aspect, the disclosure provides a user equipment for a mobile telecommunications system including circuitry configured to communicate with a new radio base station and a LTE base station, wherein the circuitry is further configured to log minimization drive test measurements for generating a log and to include an indication into the log in response to detection of coexistence of LTE transmission and new radio transmission.

According to a fifth aspect, the disclosure provides a user equipment for a mobile telecommunications system including circuitry configured to communicate with a new radio base station and a LTE base station, wherein the circuitry is further configured to log minimization drive test measurements for generating a log and to include an indication into the log for indicating whether a single mode transmission or dual mode transmission occurred during logging of the minimization drive test measurements.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
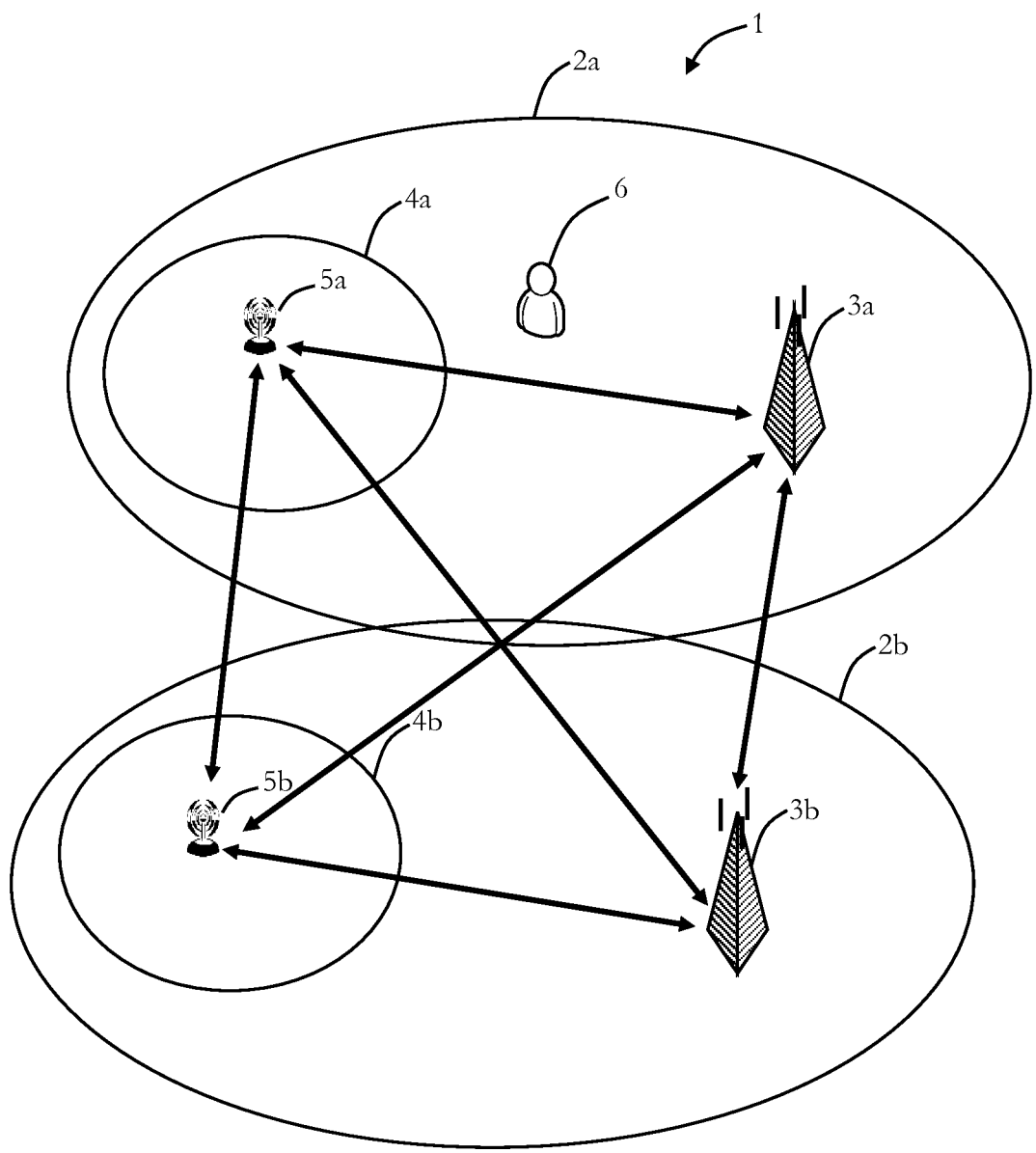
FIG. 1 illustrates a radio access network including LTE and NR base stations.

Before a detailed description of the embodiments under reference of FIG. 1 is given, general explanations are made.

As mentioned in the outset, several generations of mobile telecommunications systems are known, e.g. the third generation ("3G"), the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

As discussed, a candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

As mentioned, LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies, and there exists the successor LTE-A (LTE Advanced) allowing higher data rates than the basic LTE and which is also standardized under the control of 3GPP.

As the 5G system will be based on LTE or LTE-A, respectively, it is assumed that specific requirements of the 5G technologies and, thus, of embodiments described herein, will, basically, be dealt with by features and methods which are already defined in the LTE and LTE-A standard documentation.

As discussed, in 3GPP a work Item (WI) on New Radio Access Technology (NR) has been agreed and the new Radio Access Technology (RAT) is expected to operate in a large range of frequencies, from hundreds of MHz to 100 GHz and it is expected to cover a broad range of use cases, examples of which are given in the outset.

At least for initial deployment, NR and LTE are expected to coexist, as is also illustrated in FIG. 1. FIG. 1 illustrates an embodiment of a Radio Access Network RAN 1, which has two macro cells 2a and 2b, which are each established by a LTE (base station) eNodeB 3a and 3b. Moreover, in each of the macro cells 2a and 2b, a NR cell 4a and 4b is located, which is each established by a NR (base station) eNodeB 5a and 5b, respectively (the NR eNodeB may also be referred to as NR gNB or NR gNodeB).

A (user equipment) UE 6 can communicate with the LTE eNodeB 3a and, as long it is within the NR cell 4a, it can also communicate with the NR eNodeB 5b.

As also illustrated in FIG. 1, also the LTE eNodeBs 3a and 3b can communicate which each other, which is typically performed over the known X2-interface, but, also a communication between the LTE eNodeBs 3a and 3b and the NR eNodeBs 5a and 5b may be possible, e.g. over an Xn-interface, which is also discussed for NR. Also the NR eNodeBs 5a and 5b may communicate with each other.

Figure 2:
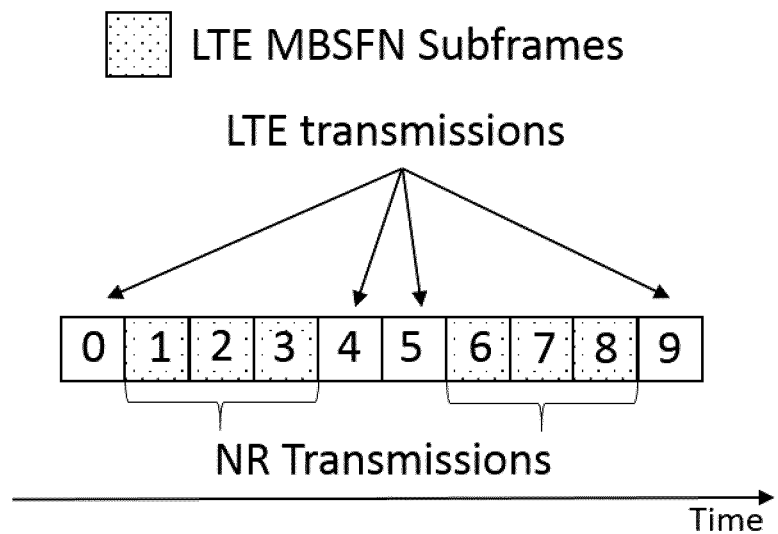
FIG. 2 illustrates the coexistence of NR and LTE subframe transmission.

The coexistence may be implemented in some embodiments, by using the same frequency resources for NR and LTE, but NR and LTE are differentiated using TDM (Time Division Multiplexing), e.g. NR uses LTE MBSFN (Multicast-Broadcast Single Frequency) subframes, as illustrated in FIG. 2.

FIG. 2 illustrates an example, where there are up to a maximum of six LTE MBSFN subframes in a radio frame. Here, exemplary, six LTE MBSFN subframes, i.e. subframes 1, 2, 3, 6, 7, 8, are used for NR transmissions and the remaining subframes are used for LTE transmissions.

Figure 3:
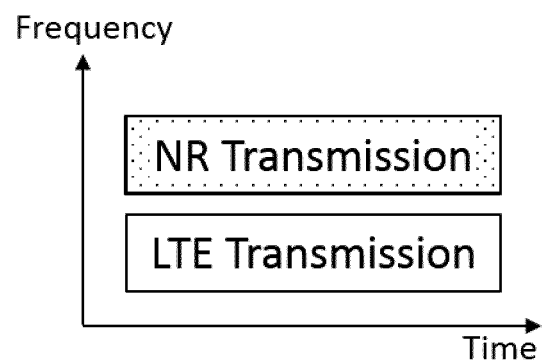
FIG. 3 illustrates the coexistence of NR and LTE transmission in the frequency domain.

Another implementation, which may be used in some embodiments as illustrated in FIG. 3, is to use separate frequency resources and implement NR as a secondary carrier in a multi-carrier operation, i.e. LTE uses one frequency carrier (lower box in FIG. 3) and NR uses another frequency carrier (upper box in FIG. 3).

One of the common deployment will be, in some embodiments, where LTE will use FDD (Frequency Division Duplexing) mode of operation and NR deploys TDD (Time Division Duplexing) mode of operation.

Such coexistence in certain frequency bands may result in two simultaneous peaks, in some embodiments, generated by the UE on uplink if simultaneous uplink in LTE and NR is configured and used.

Such peaks may generate intermodulation products, which will interfere the receiver in the UE and, in a case where, where for example, LTE deploys FDD and NR deploys TDD, the LTE downlink (DL) performance might be impacted.

Generally, the problem may be severe, in some embodiments, if LTE is impacted because intermediate frequencies are already standardized and any interference will be detrimental to the LTE performance.

However, as NR is a new system under design, it offers design flexibility and design of intermediate frequencies may take any interference from existing LTE bands into account in some embodiments. Hence, some embodiments address a scenario, where LTE deploys FDD and NR deploys TDD in the coexistence situation.

According to LTE, normally, TDD mode offers different subframe configurations, whereby subframes can be configured for downlink or uplink. The TDD configurations are described, for example, in TS 36.300, section 5 (3GPP TS 36.300, V14.3.0 (2017 June), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 14)):

TABLE 1 corresponding to Table 5.1-1: Uplink-downlink allocations (TS 36.300, section 5)

| Configu-ration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |

TABLE 1-continued corresponding to Table 5.1-1: Uplink-downlink allocations (TS 36.300, section 5)

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 1 shows for a set of seven configurations ("0", "1", . . . , "6") a switch-point periodicity and a respective allocation of ten subframes having numbers from "0" to "9", wherein "D" is a downlink allocation and "U" is a uplink allocation.

As can be taken from Table 1 above, for example, "Configuration 0" is uplink heavy, i.e. six of the ten subframes are configured as uplink, while only two of the ten subframes are configured as downlink. In "configuration 5", for example, eight of the ten subframes are configured as downlink and only one of the ten subframes is configured as uplink, such that configuration 5 is downlink heavy.

Hence, it has been recognized that it might beneficial in some embodiments if a cell configuration is exchanged between the NR base station and the LTE base station, e.g. using the X2 and/or Xn interface.

In addition, MDT (Minimization of Drive Test) measurements might be impacted, in some embodiments, if the UE has a coexistence issue and its receiver is desensitized.

Hence, it has been recognized that it might be useful in some embodiments, when the UE logs when a coexistence issue occurs and reports this to the network, e.g. as a part of MDT/SON (Self Organizing Network) framework.

Moreover, in some embodiments, the LTE eNodeB and NR gNB will support dual connectivity, as discussed above, and will have an X2 and/or Xn interface between these two nodes, as also discussed above (see also FIG. 1). The X2 interface exists between LTE base stations and X2: SETUP and X2: SETUP RESPONSE messages are exchanged before the X2-interface is set up, which can also be taken from, for example, sections referring to 9.1.2.3 X2: SETUP REQUEST, 9.1.2.4 X2 SETUP RESPONSE, and 1.1.1 Served Cell information of 3GPP TS 36.423 discussing the X2 interface application protocol (e.g. 3GPP TS 36.423 V14.3.0 (2017 June), 3rd Generation Partnership Project; Technical Specification Group Radio Access Network; Evolved Universal Terrestrial Radio Access Network (E-UTRAN); X2 application protocol (X2AP), (Release 14)).

As can be seen from the table of this document TS 36.423 (see 9.1.2.3 and 9.1.2.4), the served cell information, which is exchanged between two LTE base stations, includes a TDD subframe configuration of the cell. However, this information exchange (only) takes place between LTE-LTE eNodeBs.

For the Xn interface the situation is different, as can be taken, for example, from 3GPP TS 38.423 (e.g. 3GPP TS 38.423 V0.2.0 (2017 June), 3rd Generation Partnership Project; Technical Specification Group Radio Access Network; NG Radio Access Network (NG-RAN); Xn application protocol (XnAP), (Release 15)), which does not disclose a mechanism which is similar to the served cell information exchange between LTE base stations and there is no discussion regarding the exchange of TDD subframe configuration pattern exchange between LTE base station (e.g. eNB) and NR base station (gNB).

Hence, it has been recognized that such information exchange between LTE and NR cells is missing, although, it is generally known to provide UE specific TDM pattern exchange between LTE and NR cells, but these UE specific patterns are a subset of cell specific patterns.

Thus, some embodiments pertain to a new radio base station for a mobile telecommunications system comprising circuitry configured to communicate with at least one user equipment and at least one LTE base station and to establish a new radio cell, wherein the circuitry is further configured to transmit a time division duplexing configuration of the new radio cell to the LTE base station for identifying, based on the received time division duplexing configuration, a coexistence and intermodulation influence on an LTE receiver of the at least one user equipment.

Generally, the LTE base station may be based on the principles of LTE (LTE-A) and the new radio (NR) base station may be based on NR RAT, as also discussed above. The LTE base station may be based on the known eNodeB of LTE, as one example, and the NR base station may be based on the discussed NR eNodeB. The user equipment may be, for example, a mobile phone, smartphone, a computer, tablet, tablet personal computer, or the like, including a mobile communication interface, or any other device which is able to perform a mobile telecommunication via, for example, LTE and NR, such as a hot spot device with a mobile communication interface, etc. Hence, in some embodiments, the user equipment is configured to perform communication with the NR base station and the LTE base station simultaneously, such that the above-discussed coexistence issue may occur in some embodiments.

Hence, as also discussed above, in some embodiments, the uplink and or downlink communication between the new radio base station and the user equipment may be based on the above discussed TDD principles, while the uplink and or downlink communication between the LTE base station and the user equipment may be based on FDD principles, as discussed above.

In some embodiments, the time division duplexing configuration is transmitted during setting up of an interface between the new radio base station and the LTE base station, wherein the interface may be, as also discussed above, a X2 and/or Xn-interface and the setup procedure may following the principles as defined in TS 36.423 mentioned above with the addition of the exchange of the TDD configuration between the NR base station and the LTE base station over the X2 and/or Xn interface.

In some embodiments, the time division duplexing configuration indicates a time division duplexing subframe pattern, as also exemplary discussed above in table 1, where, for example, it is indicated which subframes are configured for downlink transmission and which one are configured for uplink transmission.

In some embodiments, the circuitry is configured to transmit the time division duplexing configuration of the new radio cell in response to a change of a subframe of the subframe pattern. Hence, in some embodiments, for example, a configuration of a subframe may be dynamically changed, e.g. from downlink to uplink and vice versa.

In some embodiments, the time division duplexing configuration is for configuring an uplink or a downlink time division duplexing transmission, as discussed above.

In some embodiments, the circuitry is further configured to receive at least one power control related parameter from the LTE base station for setting power control of the at least one user equipment. Thereby, for example, the (LTE and/or NR) receiver may be set into a specific power mode in order to reduce the negative influence of the coexistence of LTE and NR transmission (e.g. peaks as discussed above).

In some embodiments, the time division duplexing configuration includes subframe scheduling information for a predefined time window, which indicates, for example, how long a specific configuration (downlink/uplink) will occur, whether a (dynamic) change of a subframe configuration is scheduled, etc.

In some embodiments, the size of the time window depends on at least one of: interface delay between the new radio base station and the at least one LTE base station and scheduling flexibility of future subframes (e.g. LTE base station may have some restrictions in scheduling further subframes). The interface delay between the new radio base station and the at least one LTE base station may be in the order of milliseconds, e.g. 40 ms, without limiting the present disclosure to this specific value.

Some embodiments pertain to a LTE base station (e.g. eNodeB based) for a mobile telecommunications system including circuitry configured to communicate with at least one user equipment and at least one new radio base station, the new radio base station establishing a new radio cell, wherein the circuitry is further configured to receive a time division duplexing configuration of the new radio cell from the new radio base station.

In some embodiments, the LTE base station circuitry is further configured to identify, based on the received time division duplexing configuration, a coexistence and intermodulation influence on an LTE receiver of the at least one user equipment. For example, based on the TDD configuration, the circuitry can derive whether a "double peak" due to simultaneous FDD and TDD transmission, generally, may occur, such that it can be assumed that a UE may influenced by an intermodulation issue.

In some embodiments, the LTE base station circuitry is further configured to transmit scheduling information to the at least one user equipment, based on the received time division duplexing configuration. Thereby, for example, it can be ensured that a LTE (FDD) or NR (TDD) transmission does not occur in a problematic subframe in which such a "double peak" situation may occur.

In some embodiments, the LTE base station circuitry is further configured to transmit, based on the received time division duplexing configuration of the new radio cell, at least one power control related parameter to the at least one user equipment or to the new radio base station for setting a power control of the at least one user equipment. Hence, the time division duplexing configuration (e.g. pattern) is used as an additional input parameter for downlink power control. Based on this power control related parameter, the user equipment may control the LTE/NR receiver of its circuitry accordingly.

As discussed, in some embodiments, the time division duplexing configuration is received during setting up of an interface between the new radio base station and the LTE base station, and the interface may be a X2 and/or Xn-interface (which may be included in the circuitry).

As discussed, the time division duplexing configuration indicates a time division duplexing subframe pattern and the LTE base station circuitry may be further configured to receive the time division duplexing configuration of the new radio cell in response to a change of a subframe of the subframe pattern.

As discussed, the time division duplexing configuration may be for configuring an uplink or a downlink time division duplexing transmission and the time division duplexing configuration may include subframe scheduling information for a predefined time window, wherein the size of the time window may depend on at least one of: interface delay between the new radio base station and the LTE base station and scheduling flexibility of future subframes.

In some embodiments, the LTE base station circuitry is further configured to schedule a LTE uplink, based on the received subframe scheduling information. Thereby, for example, it can be avoided that the LTE uplink occurs in a problematic FDD subframe such that the discussed "double peak" situation may be avoided.

In some embodiments, the LTE base station circuitry may be further configured to transmit subframe scheduling information to the new radio base station based on the received subframe scheduling information. Hence, in such embodiments, the NR base station may avoid usage of a problematic subframe, where a "double peak" situation might occur.

Some embodiments pertain to a user equipment, as also discussed above, for a mobile telecommunications system including circuitry configured to communicate with a new radio base station and a LTE base station, wherein the circuitry is further configured to perform simultaneous communication with the LTE base station and the new radio base station, wherein the communication with the new radio base station is based on time division duplexing and a time division duplexing configuration, wherein the time division duplexing configuration is transmitted from the new radio base station to the LTE base station, as also discussed above.

In some embodiments, the UE circuitry is further configured to set a power control strategy based on at least one power control parameter received from the LTE base station or the new radio base station, as also discussed above.

Some embodiments pertain to a user equipment for a mobile telecommunications system including circuitry configured to communicate with a new radio base station and a LTE base station, wherein the circuitry is further configured to log minimization drive test measurements for generating a log and to include an indication into the log in response to detection of coexistence of LTE transmission and new radio transmission. Minimization Drive Test (MDT) measurements are well known and may be performed by the user equipment. The log including the MDT measurements is typically transmitted to the network, e.g. NR and/or LTE base station and to the core network, etc. By including an indication that the coexistence of LTE transmission and NR transmission was present during the MDT measurements, a MDT server can derive, for example, that due to the coexistence issue the MDT measurement is not reliable.

Some embodiments pertain to a user equipment for a mobile telecommunications system including circuitry configured to communicate with a new radio base station and a LTE base station, wherein the circuitry is further configured to log minimization drive test measurements for generating a log and to include an indication into the log for indicating whether a single mode transmission or dual mode transmission occurred during logging of the minimization drive test measurements.

The single mode transmission, is, for example, a single NR or LTE transmission, while the dual mode transmission is a simultaneous NR and LTE transmission, as discussed. Typically, LTE uplink HARQ transmissions are synchronous and may be transmitted along with a NR uplink transmission in some cases, such that the information whether a single mode or dual mode transmission was present may be useful for the network in order to judge reliability of the logged MDT measurements.

Although above processes have been described for a NR/LTE base station and a user equipment, the processes described herein may also pertain to a method for mobile telecommunications.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described herein, causes the methods described herein to be performed.

Figure 4:
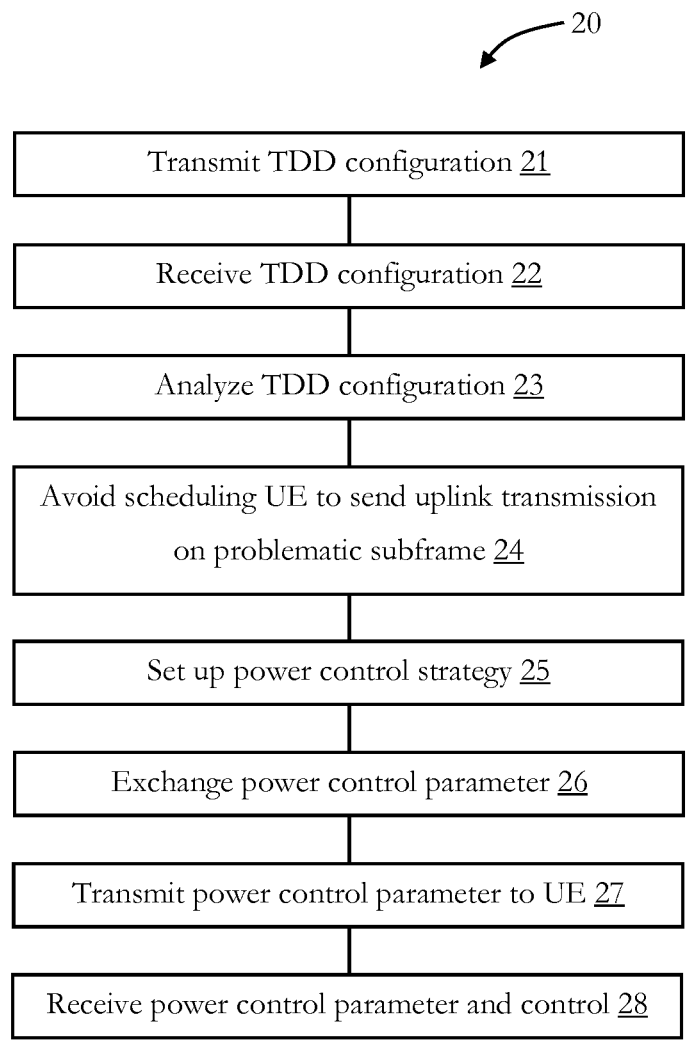
FIG. 4 illustrates a method for mobile telecommunications according to a first embodiment.

Returning to FIG. 4, there is illustrated an embodiment of a method 20 for exchanging a TDD configuration of a NR cell, such as NR cell 4a or 4b as illustrated in FIG. 1, i.e. a TDD subframe configuration pattern, which is used in the NR cell 4a or 4b with the LTE cell 2a or 2b at the time of an X2 and/or Xn interface setup, as also discussed above.

This information will be used by the LTE eNB, e.g. LTE eNodeB 3a or 3b, to know which subframes will have coexistence and intermodulation issue on an LTE receiver, e.g. of UE 6 in FIG. 1.

At 21, the NR eNodeB 5a (or 5b) transmits the TDD subframe configuration pattern, which indicates, for example, a subframe pattern as illustrated in Table 1 above, to the LTE eNode 3a (or 3b), which receives the TDD subframe configuration pattern at 22.

At 23, the LTE eNodeB 3a (or 3b) analyzes the received TDD subframe configuration pattern and at 24 the LTE eNodeB 3a (or 3b) will avoid scheduling the UE to send the uplink transmission on the subframes on that NR uplink transmission will occur, e.g. by changing correspondingly the schedule and/or sending corresponding scheduling information to the UE.

Alternatively to 24, at 25, a power control strategy on the NR uplink subframes for the UE may be set up, e.g. by the LTE eNodeB 3a (or 3b) and/or the NR eNodeB 5a (or 5b).

At 26, in this case the power control related parameter(s) could be exchanged between the LTE eNodeB 3a (or 3b) and the NR eNodeB 5a (or 5b) for better coordination. Then, at 27, the corresponding power control related parameter(s) are transmitted to the UE either by the LTE eNodeB 3a (or 3b) or by the NR eNodeB 5a (or 5b).

At 28, the UE receives the power control related parameter(s) and controls, for example, its receiver accordingly.

Figure 5:
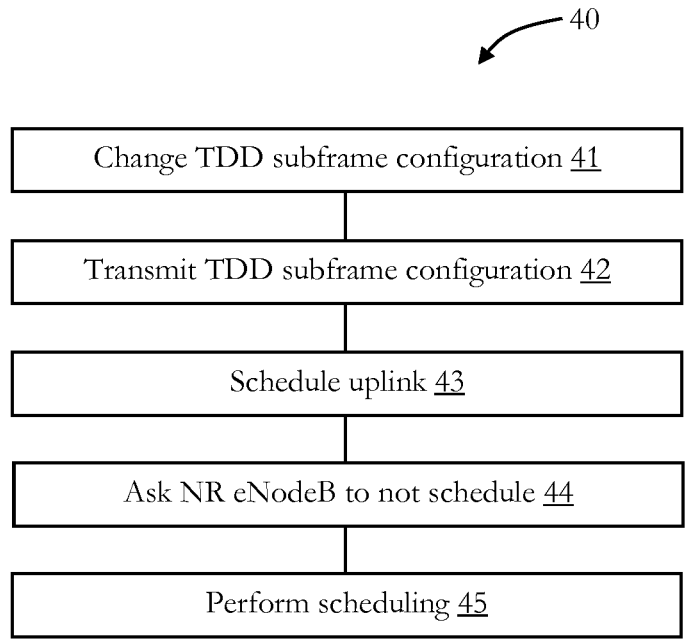
FIG. 5 illustrates a method for mobile telecommunications according to a second embodiment.

In another embodiment, as also illustrated in FIG. 5, in a method 40, this information is exchanged frequently.

In this embodiment, the NR TDD cell 4a (or 4b) (i.e. NR eNodeB 5a or 5b) may change uplink/downlink subframe configuration more dynamically, e.g. at 41, the NR TDD cell may change the subframe configuration.

This feature is already available in LTE and called NAICS (Network-Assisted Interference Cancellation and Suppression) whereby one subframe is changed from uplink to downlink and vice versa (e.g. in Table 1, this is shown above with the special subframe pattern in the table).

In some embodiments, the NR TDD may offer a more dynamic switching of subframes and in this embodiment, the subframe configuration is exchanged as and when it is changed. Hence, the change of the TDD subframe configuration may trigger the exchange of the respective TDD configuration.

In some embodiments, and some situations, it is not possible to use the X2: SETUP procedure, as discussed above, as this procedure is used once at the time of interface setup only.

Hence, at 42, an eNodeB configuration update procedure (or something similar in other embodiments, e.g. such information exchange can occur in a UE specific signaling)) is used for this purpose instead and the corresponding TDD subframe configuration is transmitted from the NR eNodeB 5a (or 5b) to the LTE eNodeB 3a (or 3b).

In this embodiment, the TDD subframe configuration pattern includes some information (information about a predefined time window) which allows to look forward in the time domain so that a neighboring LTE eNodeB 3a (or 3b) can plan ahead and schedule an LTE uplink accordingly at 43.

Alternatively, at 44, the LTE eNodeB 3a (or 3b) asks the NR eNodeB 5a (or 5b) to not schedule the UE in those uplink subframes where the LTE eNodeB 3a (or 3b) itself wants to schedule the LTE uplink. The NR eNodeB 5a (or 5b) may receive a corresponding request from the LTE eNodeB and follows this request.

In this embodiment, the window size takes a X2 (Xn) interface delay and scheduling flexibility of the future subframes into account.

Generally, a value of 40 msec is used for exchanging Almost Blank Subframe (ABS) patterns between LTE base stations, which is already standardized. Generally, the ABS pattern is used to avoid a macro cell interference to UEs at the edge of a small cell and the macro cell does not schedule on subframes which are indicated by a small cell as problematic. In this embodiment, a similar timing mechanism is used, e.g. also 40 msec, as a window size.

In some embodiments, the time window size is further reduced to 6 msec in case a backhaul delay is minimal.

At 45, scheduling is correspondingly performed, i.e. either based on scheduling of an LTE uplink at 43 or based on "negative" scheduling at 44, where the NR eNodeB is asked to not schedule the UE in those uplink subframes where itself wants to schedule the LTE uplink.

Figure 6:
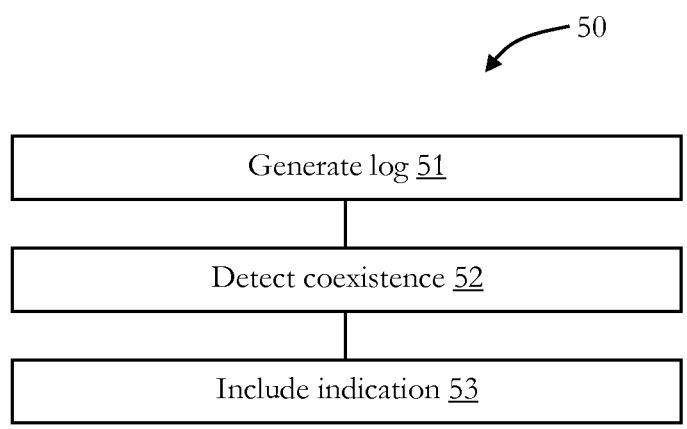
FIG. 6 illustrates a method for mobile telecommunications according to a third embodiment.

In some embodiments, as illustrated in FIG. 6, a method 50 pertains to enhancement of MDT measurement logging, as will be discussed in the following.

At 51, the UE performs MDT measurements and logs them accordingly, i.e. it generates a (MDT measurement) log.

At 52, the UE detects that the measurement results were (maybe) affected by the coexistence and intermodulation issue, discussed, where the receiver of the UE was potentially desensitized.

At 53, the UE enhances the log by including an indication that the measurement results were affected by the coexistence and intermodulation issue, as discussed above, where the receiver was potentially desensitized. For instance, an information element (IE) may be added to the MDT measurement log for including the indication as discussed.

3GPP TS 37.320 (e.g. 3GPP TS 37.320 V14.0.0 (2017 March), 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2, (Release 14)), explains the logging when UE encounters in-device coexistence issue as follows (section 5.1.1.2):

When an E-UTRA UE detects an in-device coexistence problem that may affect the logged measurement results, the UE shall stop measurement logging, indicate in the log that an in-device coexistence problem has occurred, and keep the duration timer running. When the in-device coexistence problem is no longer present, and the duration timer has not expired, the logging resumes, with a leap in time stamp.

This in-device coexistence problem refers, for example, to coexistence of WiFi and Bluetooth communication or the like.

According to 3GPP TS 36.331 (e.g. 3GPP TS 36.331 V14.3.0 (2017 June), 3rd Generation Partnership Project; Technical Specification Group Radio Access Network; Evolved Universal Terrestrial Radio Access (E-UTRA); Radio Resource Control (RRC); Protocol specification, (Release 14)), the UE reports that in-device coexistence issue was detected and includes following IE into the logged measurement results (see section 6.2.2):

```
LogMeasInfo-r10 ::=        SEQUENCE {
                           ]],
    [[                     inDeviceCoexDetected-r13   ENUMERATED {true}
    OPTIONAL
    ]],
}
```

For instance, in some embodiments, the new IE is added to this logged measurements information for indicating coexistence and intermodulation issues or alternatively a mechanism similar to that is introduced.

The network side (e.g. NR/LTE eNodeB, core network or other network entity) may receive this indication and, thus, can decide or determine the reliability of the measurements.

Figure 7:
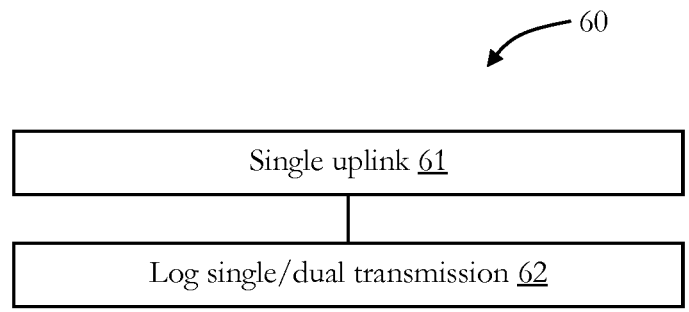
FIG. 7 illustrates a method for mobile telecommunications according to a fourth embodiment.

In another embodiment, as also illustrated in FIG. 7, in a method 60, it may happen that the UE is performing, at 61, a single uplink at a time i.e. either an LTE or NR uplink, such that the LTE downlink is typically error free, i.e. is not affected by the coexistence issue discussed above, such that, in this case, the UE MDT measurements will not be affected.

But, since the LTE uplink HARQ retransmissions are synchronous, in some embodiments, and may need to be transmitted along with an NR uplink in certain extraordinary situations, in this embodiment the UE logs that it was performing single transmission (TX) or dual transmission (TX) operation (mode) at 62 while performing MDT logged measurements. The dual transmission operation (mode) means simultaneous LTE and NR transmission as discussed herein. The indication of the single/dual transmission operation can be included as a further information element into the MDT measurement log.

Also here, the network side (e.g. NR/LTE eNodeB, core network or other network entity) may receive this indication and, thus, can decide or determine the reliability of the measurements.

Summarizing and as discussed above, in some embodiments, the NR cell TDD subframe configuration is exchanged with the LTE cell. If the NR TDD cell subframe configuration for uplink and downlink changes dynamically, then such information is exchanged in advance for a window, in some embodiments.

In some embodiments, if MDT measurements are impaired due to receiver desensitization, then the UE logs the issue and reports that the issue took place. As discussed, the UE can additionally log the measurements even if impaired and report the measurements.

Figure 8:
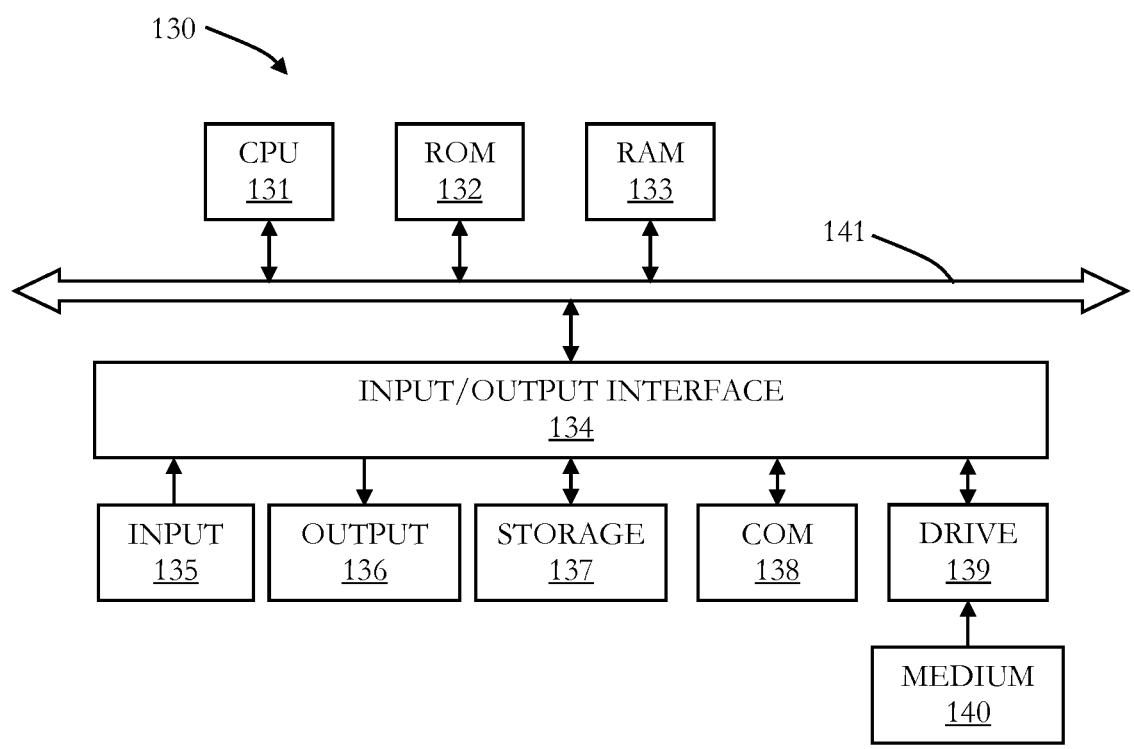
FIG. 8 illustrates a general purpose computer which can implement anyone of the circuitries, base stations and user equipments as described herein.

In the following, an embodiment of a general purpose computer 130 is described under reference of FIG. 8. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A new radio base station for a mobile telecommunications system comprising circuitry configured to communicate with at least one user equipment and at least one LTE base station and to establish a new radio cell, wherein the circuitry is further configured to:
transmit a time division duplexing configuration of the new radio cell to the LTE base station for identifying, based on the received time division duplexing configuration, a coexistence and intermodulation influence on an LTE receiver of the at least one user equipment.

(2) The new radio base station of (1), wherein the time division duplexing configuration is transmitted during setting up of an interface between the new radio base station and the LTE base station.

(3) The new radio base station of (2), wherein the interface is a X2 or Xn-interface.

(4) The new radio base station of anyone of (1) to (3), wherein the time division duplexing configuration indicates a time division duplexing subframe pattern.

(5) The new radio base station of (4), wherein the circuitry is configured to transmit the time division duplexing configuration of the new radio cell in response to a change of a subframe of the subframe pattern.

(6) The new radio base station of anyone of (1) to (5), wherein the time division duplexing configuration is for configuring an uplink or a downlink time division duplexing transmission.

(7) The new radio base station of anyone of (1) to (6), wherein the circuitry is further configured to receive at least one power control related parameter from the LTE base station for setting power control of the at least one user equipment.

(8) The new radio base station of anyone of (1) to (7), wherein the time division duplexing configuration includes subframe scheduling information for a predefined time window.

(9) The new radio base station of (8), wherein the size of the time window depends on at least one of: interface delay between the new radio base station and the at least one LTE base station and scheduling flexibility of future subframes.

(10) A LTE base station for a mobile telecommunications system comprising circuitry configured to communicate with at least one user equipment and at least one new radio base station, the new radio base station establishing a new radio cell, wherein the circuitry is further configured to:
receive a time division duplexing configuration of the new radio cell from the new radio base station.

(11) The LTE base station of (10), wherein the circuitry is further configured to identify, based on the received time division duplexing configuration, a coexistence and intermodulation influence on an LTE receiver of the at least one user equipment.

(12) The LTE base station of anyone of (10) to (11), wherein the circuitry is further configured to transmit scheduling information to the at least one user equipment, based on the received time division duplexing configuration.

(13) The LTE base station of anyone of (10) to (12), wherein the circuitry is further configured to transmit, based on the received time division duplexing configuration of the new radio cell, at least one power control related parameter to the at least one user equipment or to the new radio base station for setting a power control of the at least one user equipment.

(14) The LTE base station of anyone of (10) to (13), wherein the time division duplexing configuration is received during setting up of an interface between the new radio base station and the LTE base station.

(15) The LTE base station of (14), wherein the interface is a X2 or Xn-interface.

(16) The LTE base station of anyone of (10) to (15), wherein the time division duplexing configuration indicates a time division duplexing subframe pattern.

(17) The LTE base station of (16), wherein the circuitry is configured to receive the time division duplexing configuration of the new radio cell in response to a change of a subframe of the subframe pattern.

(18) The LTE base station of anyone of (10) to (17), wherein the time division duplexing configuration is for configuring an uplink or a downlink time division duplexing transmission.

(19) The LTE base station of anyone of (10) to (18), wherein the time division duplexing configuration includes subframe scheduling information for a predefined time window.

(20) The LTE base station of (19), wherein the size of the time window depends on at least one of: interface delay between the new radio base station and the LTE base station and scheduling flexibility of future subframes.

(21) The LTE base station of (19) or (20), wherein the circuitry is further configured to schedule a LTE uplink, based on the received subframe scheduling information.

(22) The LTE base station of anyone of (19) to (21), wherein the circuitry is further configured to transmit subframe scheduling information to the new radio base station based on the received subframe scheduling information.

(23) A user equipment for a mobile telecommunications system comprising circuitry configured to communicate with a new radio base station and a LTE base station, wherein the circuitry is further configured to:
perform simultaneous communication with the LTE base station and the new radio base station, wherein the communication with the new radio base station is based on time division duplexing and a time division duplexing configuration, wherein the time division duplexing configuration is transmitted from the new radio base station to the LTE base station.

(24) The user equipment of (23), wherein the circuitry is further configured to set a power control strategy based on at least one power control parameter received from the LTE base station or the new radio base station.

(25) A user equipment for a mobile telecommunications system comprising circuitry configured to communicate with a new radio base station and a LTE base station, wherein the circuitry is further configured to:

log minimization drive test measurements for generating a log and to include an indication into the log in response to detection of coexistence of LTE transmission and new radio transmission.

(26) A user equipment for a mobile telecommunications system comprising circuitry configured to communicate with a new radio base station and a LTE base station, wherein the circuitry is further configured to:

log minimization drive test measurements for generating a log and to include an indication into the log for indicating whether a single mode transmission or dual mode transmission occurred during logging of the minimization drive test measurements.

The invention claimed is:

1. A New Radio (NR) base station for a mobile telecommunications system comprising:
   circuitry configured to:
   communicate with a user equipment and a long term evolution (LTE) base station and to establish a NR cell, and
   transmit a time division duplexing configuration of the NR cell to the LTE, base station to enable the LTE base station to:
   receive and analyze the time division duplexing configuration of the NR cell;
   identify at least one of a coexistence or an intermodulation influence, between the time division duplexing configuration of the NR cell and a time division duplexing configuration of a LTE radio cell, on an LTE receiver of the user equipment; and
   change an uplink schedule parameter of the user equipment on the LTE radio cell in order to mitigate the identified at least one of the coexistence or the intermodulation influence.

2. The NR base station of claim 1, wherein the time division duplexing configuration of the NR cell is transmitted during setting up of an interface between the new radio base station and the LTE base station.

3. The NR base station of claim 2, wherein the interface is a X2 or Xn-interface.

4. The NR radio base station of claim 1, wherein the time division duplexing configuration of the NR cell indicates a time division duplexing subframe pattern of the NR cell.

5. The NR radio base station of claim 4, wherein the circuitry is configured to transmit the time division duplexing configuration of the NR cell in response to a change of a subframe of the time division duplexing subframe pattern of the NR cell.

6. The NR base station of claim 1, wherein the time division duplexing configuration of the NR cell is for configuring at least one of an uplink time division duplexing transmission of the NR cell or a downlink time division duplexing transmission of the NR cell.

7. The NR base station of claim 1, wherein the circuitry is further configured to receive at least one LTE power control related parameter from the LTE base station for setting an LTE power of the user equipment.

8. The NR base station of claim 1, wherein the time division duplexing configuration of the NR cell includes subframe scheduling information for a predefined time window.

9. The NR base station of claim 8, wherein the size of the time window depends on at least one of:

an interface delay between the NR radio base station and the LTE base station; or
scheduling flexibility of future subframes of the time division duplexing configuration of the NR cell.

10. A long term evolution (LTE) base station for a mobile telecommunications system comprising:
    circuitry configured to communicate with a user equipment and a New Radio (NR) radio base station regarding a NR cell established by the NR radio base station, wherein the circuitry is further configured to:
    receive a time division duplexing configuration of the NR cell from the NR base station,
    analyze the received time division duplexing configuration of the NR cell;
    identify, based on the analysis, at least one of a coexistence or an intermodulation influence between the time division duplexing configuration of the NR cell and a time division duplexing configuration of a LTE radio cell, on an LTE receiver of the user equipment; and
    change an uplink schedule parameter of the user equipment on the LTE radio cell in order to mitigate the identified at least one of the coexistence or the intermodulation influence.

11. The LTE base station of claim 10, wherein the circuitry is further configured to transmit, to the user equipment, LTE power control information that mitigates the at least one of the coexistence or the intermodulation influence that is identified by the LTE base station based on the time division duplexing configuration of the NR cell.

12. The LTE base station of claim 10, wherein the time division duplexing configuration of the N cell is received during setting up of an interface between the NR base station and the LTE base station.

13. The LTE base station of claim 12, wherein the interface is a X2 or Xn-interface.

14. The LTE base station of claim 10, wherein the time division duplexing configuration of the NR cell indicates a time division duplexing subframe pattern of the NR base station.

15. The LTE base station of claim 14, wherein the circuitry is configured to receive the time division duplexing configuration of the NR cell in response to a change of a subframe of the time division duplexing subframe pattern of the NR base station.

16. The LTE base station of claim 10, wherein the time division duplexing configuration of the NR cell is for configuring at least one of an uplink time division duplexing transmission of the NR cell or a downlink time division duplexing transmission of the NR cell.

17. The LTE base station of claim 10, wherein the time division duplexing configuration of the NR cell includes subframe scheduling information for a predefined time window.

18. A method for a New Radio (NR) radio base station for a mobile telecommunications system, the method comprising:
    communicating with a user equipment and a long term evolution (LIE) base station and to establish a NR cell, and
    transmitting a time division duplexing configuration of the NR cell to the LIE base station to enable the LTE base station to enable the LTE base station to:
    receive and analyze the time division duplexing configuration of the NR cell;
    identify at least one of a coexistence or an intermodulation influence, between the time division duplexing configuration of the NR cell and a time division duplexing configuration of a LTE radio cell, on an LTE receiver of the user equipment; and change an uplink schedule parameter of the user equipment on the LTE radio cell in order to mitigate the identified at least one of the coexistence or the intermodulation influence.

19. A method for a long term evolution (LTE) base station for a mobile telecommunications system, the method comprising:

communicating with a user equipment and a New Radio (NR) radio base station regarding a NR cell established by the NR base station;

receiving a time division duplexing configuration of the NR cell from the NR radio base station, analyzing the received time division duplexing configuration of the NR cell;

identifying, based on the analysis, at least one of a coexistence or an intermodulation influence between the time division duplexing configuration of the NR cell and a time division duplexing configuration of a LTE radio cell, on an LIE receiver of the user equipment; and changing an uplink schedule parameter of the user equipment on the LIE radio cell in order to mitigate the identified at least one of the coexistence or the intermodulation influence.

* * * * *